(12) United States Patent
Bleile et al.

(10) Patent No.: US 7,020,488 B1
(45) Date of Patent: Mar. 28, 2006

(54) COMMUNICATIONS UNIT, SYSTEM AND METHODS FOR PROVIDING MULTIPLE ACCESS TO A WIRELESS TRANSCEIVER

(75) Inventors: Leonard George Bleile, Calgary (CA); Christopher Henry Becker, Calgary (CA)

(73) Assignee: Embedded Systems Products Inc., Calgary (CA)

( * ) Notice: Subject to any disclaimer, the term of this patent is extended or adjusted under 35 U.S.C. 154(b) by 696 days.

(21) Appl. No.: 09/619,363

(22) Filed: Jul. 19, 2000

(51) Int. Cl.
*H04B 1/38* (2006.01)
*H04M 1/00* (2006.01)

(52) U.S. Cl. ..................... 455/557; 455/414.1
(58) Field of Classification Search ............ 455/557, 455/414.1, 426, 462, 500, 552, 573, 426.2, 455/554.2
See application file for complete search history.

(56) References Cited

U.S. PATENT DOCUMENTS

| | | | | |
|---|---|---|---|---|
| 4,150,254 A | | 4/1979 | Schussler et al. | 179/2 TV |
| 4,519,074 A | * | 5/1985 | Basile | 370/480 |
| 4,841,562 A | | 6/1989 | Lem | 379/104 |
| 4,899,370 A | | 2/1990 | Kameo et al. | 379/104 |
| 5,010,565 A | | 4/1991 | Nash et al. | 379/61 |
| 5,117,450 A | | 5/1992 | Joglekar et al. | 379/58 |
| 5,128,987 A | | 7/1992 | McDonough et al. | 379/102 |
| 5,138,649 A | | 8/1992 | Krisbergh et al. | 379/56 |
| 5,333,177 A | | 7/1994 | Braitberg et al. | 379/59 |
| 5,349,638 A | | 9/1994 | Pitroda et al. | 379/142 |
| 5,375,160 A | | 12/1994 | Guidon et al. | 379/52 |
| 5,420,907 A | | 5/1995 | Shapiro | 379/38 |
| 5,420,913 A | | 5/1995 | Hashimoto | 379/102 |
| 5,526,403 A | * | 6/1996 | Tam | 455/426 |
| 5,528,673 A | | 6/1996 | Rosenthal | 379/102 |
| 5,535,274 A | | 7/1996 | Braitberg et al. | 379/446 |

(Continued)

FOREIGN PATENT DOCUMENTS

| GB | 2 365 266 A | 2/2002 |
|---|---|---|
| WO | 02/15542 A2 | 2/2002 |

OTHER PUBLICATIONS

"Si3210 ProSLIC™," *Silicon Laboratories Inc.*, Austin, Texas, 2 pages total (published at least as early as Jan. 2000).

*Primary Examiner*—Nay Maung
*Assistant Examiner*—Edan Orgad
(74) *Attorney, Agent, or Firm*—Ladas & Parry LLP

(57) ABSTRACT

The present invention addresses the above need by providing a communications unit comprising a first wireless transceiver port operable to communicate with a first wireless transceiver operable to conduct wireless communications with a wireless base station; and a first expansion interface in communication with the first wireless transceiver port and operable to communicate with a second communications unit on a plurality of communications channels, to permit the second communications unit to access the first wireless transceiver. Effectively, a plurality of communications units of the type described above may be connected together to create a system for providing multiple access to a wireless transceiver, where the wireless transceiver may be a wireless transceiver on any of the so connected communications units. Using a system of this type, users may add the ability to add additional communications appliances and/or additional wireless communications paths to the system. Thus, the system is expandable and contractible and completely eliminates the need to connect communications appliances to land lines. In one embodiment the first expansion interface is operable to conduct communications with the second communications unit on time multiplex channels. Alteratively, such communications may be conducted on frequency multiplex channels.

39 Claims, 13 Drawing Sheets

U.S. PATENT DOCUMENTS

| | | | |
|---|---|---|---|
| 5,544,227 A * | 8/1996 | Blust et al. ............... 455/426.1 |
| 5,555,258 A * | 9/1996 | Snelling et al. ............. 370/280 |
| 5,592,064 A | 1/1997 | Morita ........................... 320/2 |
| 5,600,711 A | 2/1997 | Yuen ........................... 379/102 |
| 5,603,078 A | 2/1997 | Henderson et al. ........... 455/5.1 |
| 5,612,990 A | 3/1997 | Meier et al. ................... 379/58 |
| 5,666,399 A | 9/1997 | Bales et al. .................. 379/419 |
| 5,671,267 A | 9/1997 | August et al. ................. 379/61 |
| 5,696,815 A | 12/1997 | Smyk ........................... 379/142 |
| 5,706,334 A | 1/1998 | Balk et al. ..................... 379/67 |
| 5,714,943 A * | 2/1998 | Rasor ........................... 340/7.1 |
| 5,727,053 A | 3/1998 | Sizer II et al. ............. 379/142 |
| 5,754,546 A | 5/1998 | Voit et al. .................... 370/384 |
| 5,754,641 A | 5/1998 | Voit et al. ...................... 79/354 |
| 5,802,468 A | 9/1998 | Gallant et al. ............... 455/422 |
| 5,805,677 A | 9/1998 | Ferry et al. ............... 379/93.35 |
| 5,805,682 A | 9/1998 | Voit et al. .................... 379/142 |
| 5,818,197 A | 10/1998 | Miller et al. ................. 320/107 |
| 5,822,427 A | 10/1998 | Braitberg et al. ........... 379/454 |
| 5,870,155 A | 2/1999 | Erlin ........................... 348/734 |
| 5,870,453 A | 2/1999 | Shapiro ........................ 379/38 |
| 5,898,931 A | 4/1999 | l'Anson et al. ............. 455/560 |
| 5,937,038 A | 8/1999 | Bell et al. ................. 379/93.17 |
| 5,946,616 A * | 8/1999 | Schornack et al. ....... 455/426.1 |
| 5,953,676 A * | 9/1999 | Berry et al. ................. 455/564 |
| 5,999,620 A | 12/1999 | Pinel et al. .................. 379/428 |
| 6,073,031 A * | 6/2000 | Helstab et al. ............... 455/557 |
| 6,091,758 A | 7/2000 | Ciccone et al. ............. 375/132 |
| 6,128,504 A | 10/2000 | Ciccone ...................... 455/464 |
| 6,205,326 B1 | 3/2001 | Tell et al. .................... 455/406 |
| 6,212,377 B1 * | 4/2001 | Dufour et al. .............. 455/426 |
| 6,366,784 B1 * | 4/2002 | Hsueh ......................... 455/462 |
| 6,400,957 B1 * | 6/2002 | Rodrigues et al. .......... 455/462 |
| 6,424,840 B1 | 7/2002 | Fitch et al. .................. 455/456 |
| 6,466,799 B1 * | 10/2002 | Torrey et al. ............... 455/462 |
| 6,480,714 B1 * | 11/2002 | DePani et al. .............. 455/426 |
| 6,487,403 B1 * | 11/2002 | Carroll ........................ 455/419 |
| 2002/0009991 A1 * | 1/2002 | Lu et al. ...................... 455/422 |
| 2002/0025832 A1 | 2/2002 | Durian et al. ............... 455/556 |
| 2003/0190018 A1 | 10/2003 | Bleile et al. ................ 379/67.1 |

* cited by examiner

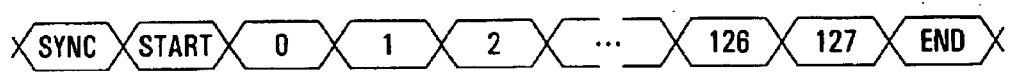

```
X SYNC X START X 0 X 1 X 2 X ··· X 126 X 127 X END X
```

| STIMULUS | STIMULUS |
|---|---|
| DETECT DTMF PROGRAM FROM SLIC 80 OR WIRELESS INTERFACE 64 (ex: *90) | SET PROGRAM MODE FLAG IN RAM 65 |
| DETECT DIGITS '1 nnn' FROM SLIC 80 OR WIRELESS INTERFACE 64 | SET MODULE ID=nnn IN RAM 65 |
| DETECT DIGITS '2', '0' FROM SLIC 80 OR WIRELESS INTERFACE 64 | SET LOCAL OUTGOING ACCESS FLAG IN RAM 65 |
| DETECT DIGITS '2', '1' FROM SLIC 80 OR WIRELESS INTERFACE 64 | SET GLOBAL OUTGOING ACCESS FLAG IN RAM 65 |
| DETECT DIGITS '3', '0' FROM SLIC 80 OR WIRELESS INTERFACE 64 | SET LOCAL INCOMING ACCESS FLAG IN RAM 65 |
| DETECT DIGITS '3', '1' FROM SLIC 80 OR WIRELESS INTERFACE 64 | SET GLOBAL INCOMING ACCESS FLAG IN RAM 65 |
| DETECT DIGITS '4 nnn' FROM SLIC 80 OR WIRELESS INTERFACE 64 | SET MODULE NAME=nnn IN RAM 65 |

| SOURCE (122) | DESTINATION (124) | COMMAND (126) | LENGTH (128) | DATA (130) | CHECKSUM (132) |
|---|---|---|---|---|---|

FIG. 5

COMMAND SET: (CHANNEL 0 COMMANDS)

1.0 QUERY_SLIC (166)

| SRC | DEST | 01 | 0 | NULL | CHECKSUM |

1.1 QUERY_SLIC ACKNOWLEDGEMENT (168)

| SRC | DEST | 01 | 1 | ACK/NACK | CHECKSUM |

2.0 QUERY_CELL (160)

| SRC | DEST | 02 | 0 | NULL | CHECKSUM |

2.1 QUERY_CELL ACKNOWLEDGEMENT (162)

| SRC | DEST | 02 | 1 | ACK/NACK | CHECKSUM |

3.0 CONTROL_SLIC (170)
REQUESTS CONTROL OF A PARTICULAR SLIC

| SRC | DEST | 03 | 0 | NULL | CHECKSUM |

3.1 CONTROL_SLIC ACKNOWLEDGEMENT (172)
RESPONSE TO A CONTROL REQUEST TO INDICATE THAT CONTROL HAS BEEN ESTABLISHED

| SRC | DEST | 03 | 1 | ACK/NACK | CHECKSUM |

4.0 CONTROL_CELL (164)
REQUESTS CONTROL OF A PARTICULAR CELL

| SRC | DEST | 04 | 0 | NULL | CHECKSUM |

4.1 CONTROL_CELL ACKNOWLEDGEMENT

| SRC | DEST | 04 | 1 | ACK/NACK | CHECKSUM |

5.0 FREE_SLIC ( )
RELEASES CONTROL OF A PARTICULAR SLIC

| SRC | DEST | 05 | 0 | NULL | CHECKSUM |

5.1 FREE_SLIC ACKNOWLEDGEMENT

| SRC | DEST | 05 | 1 | ACK/NACK | CHECKSUM |

6.0 FREE_CELL (154)
RELEASES CONTROL OF A PARTICULAR CELL

| SRC | DEST | 06 | 0 | NULL | CHECKSUM |

6.1 FREE_CELL ACKNOWLEDGEMENT

| SRC | DEST | 06 | 1 | ACK/NACK | CHECKSUM |

7.0 GEN_RING (174)
COMMAND TO SLIC TO GENERATE RING TONE

| SRC | DEST | 07 | N | RING DATA | CHECKSUM |

7.1 GEN_RING ACKNOWLEDGEMENT (176)

| SRC | DEST | 07 | 1 | ACK/NACK | CHECKSUM |

FIG. 6A

8.0 GEN_TONE
COMMAND TO SLIC TO GENERATE A PARTICULAR TONE (CAS, SAS, CP, ETC)

| SRC | DEST | 08 | N | TONE DATA | CHECKSUM |
|---|---|---|---|---|---|

8.1 GEN_TONE ACKNOWLEDGEMENT

| SRC | DEST | 08 | 1 | ACK/NACK | CHECKSUM |
|---|---|---|---|---|---|

9.0 SEND_FSK (182)
COMMAND TO SLIC TO TRANSFER FSK DATA (CALLER ID, MESSAGE WAITING, ADSI ETC)

| SRC | DEST | 09 | N | CLID DATA | CHECKSUM |
|---|---|---|---|---|---|

9.1 SEND_CLID ACKNOWLEDGEMENT

| SRC | DEST | 09 | 1 | ACK/NACK | CHECKSUM |
|---|---|---|---|---|---|

10.0 CONNECTAUDIO_SLIC (184)
COMMAND TO SLIC TO CONNECT AUDIO TO A PARTICULAR PCM CHANNEL

| SRC | DEST | 0A | 1 | CHANNEL | CHECKSUM |
|---|---|---|---|---|---|

10.1 CONNECTAUDIO_SLIC ACKNOWLEDGEMENT

| SRC | DEST | 0A | 1 | ACK/NACK | CHECKSUM |
|---|---|---|---|---|---|

11.0 CONNECTAUDIO_CELL
COMMAND TO CELL TO CONNECT AUDIO TO A PARTICULAR PCM CHANNEL

| SRC | DEST | 0B | 0 | CHANNEL | CHECKSUM |
|---|---|---|---|---|---|

11.1 CONNECTAUDIO_CELL ACKNOWLEDGEMENT

| SRC | DEST | 0B | 1 | ACK/NACK | CHECKSUM |
|---|---|---|---|---|---|

12.0 DISCONNECTAUDIO_SLIC
COMMAND TO SLIC TO DISCONNECT AUDIO PATH

| SRC | DEST | 0C | 1 | CHANNEL | CHECKSUM |
|---|---|---|---|---|---|

12.1 DISCONNECTAUDIO_SLIC ACKNOWLEDGEMENT

| SRC | DEST | 0C | 1 | ACK/NACK | CHECKSUM |
|---|---|---|---|---|---|

13.0 DISCONNECTAUDIO_CELL (152)
COMMAND TO CELL TO DISCONNECT AUDIO PATH

| SRC | DEST | 0D | 0 | NULL | CHECKSUM |
|---|---|---|---|---|---|

13.1 DISCONNECTAUDIO_CELL ACKNOWLEDGEMENT

| SRC | DEST | 0D | 1 | ACK/NACK | CHECKSUM |
|---|---|---|---|---|---|

FIG. 6B

14.0 SLIC_LINESTATUS
157 MESSAGE GENERATED BY SLIC TO INDICATE LINE STATUS (ON-HOOK OR OFF-HOOK)

| SRC | DEST | 0E | 0 | NULL | CHECKSUM |

14.1 SLIC_LINESTATUS ACKNOWLEDGEMENT

| SRC | DEST | 0E | 1 | ACK/NACK | CHECKSUM |

15.0 SLIC_DIGITSDIALED (156)
156 MESSAGE GENERATED BY SLIC TO INDICATE TAHT DIGITS HAVE BEEN DETECTED AT THE ANALOG INTERFACE

| SRC | DEST | 0F | 1 | DIGIT | CHECKSUM |

15.1 SLIC_DIGITSDIALED ACKNOWLEDGEMENT

| SRC | DEST | 0F | 1 | ACK/NACK | CHECKSUM |

16.0 KEYPRESS_CELL (158)
158 COMMAND TO CELL TELLING IT TO SIMULATE KEY PRESSES

| SRC | DEST | 10 | 1 | KEY DATA | CHECKSUM |

16.1 KEYPRESS_CELL ACKNOWLEDGEMENT

| SRC | DEST | 10 | 1 | ACK/NACK | CHECKSUM |

17.0 CELL_DIGITSDIALED
MESSAGE GENERATED BY CELL TO INDICATE THAT DIGITS HAVE BEEN DETECTED AT THE CELL

| SRC | DEST | 11 | 1 | DIGIT | CHECKSUM |

17.1 CELL_DIGITSDIALED ACKNOWLEDGEMENT

| SRC | DEST | 11 | 1 | ACK/NACK | CHECKSUM |

18.0 CELL_CALLPROGRESS
MESSAGE GENERATED BYCELL TO INDICATE CALL PROGESS TONES (SAS, CAS, BUSY, OVERFLOW ETC)

| SRC | DEST | 12 | 1 | KEY DATA | CHECKSUM |

18.1 CELL_CALLPROGRESS ACKNOWLEDGEMENT

| SRC | DEST | 12 | 1 | ACK/NACK | CHECKSUM |

19.0 GLOBAL_QUERY_FREE_CELL
COMMAND SENT GLOBALLY TO FIND THE EXISTENCE OF A FREE CELL

| SRC | 0 (GLOBAL) | 13 | 0 | NULL | CHECKSUM |

19.1 GLOBAL_QUERY_FREE_CELL ACKNOWLEDGEMENT
RETURNS THE IDENTIFICATION OF A FREE CELL

| SRC | DEST | 13 | 1 | ACK/NACK | CHECKSUM |

20.0 GLOBAL_QUERY_MODULE_EXIST

| SRC | 0 (GLOBAL) | 14 | 0 | NULL | CHECKSUM |

20.1 GLOBAL_QUERY_MODULE_EXIST ACKNOWLEDGEMENT

| SRC | DEST | 14 | 1 | ACK/NACK | CHECKSUM |

FIG. 6C

| EVENT ID | STIMULUS | RESPONSE |
|---|---|---|
| EVENT ID | STIMULUS | POLL SLIC, READ REGISTERS, COPY REGISTERS INTO RAM 65. CHECK FLAGS AGAINST LOOKUP TABLE FOR INTERRUPT SOURCE. ON-HOOK: GENERATE SLIC ON-HOOK EVENT. OFF-HOOK: GENERATE SLIC OFF-HOOK EVENT. CHECK PROGRAMMING TABLES IN RAM 65 AND SET LOCAL_CELL OR GLOBAL_CELL VOICE ROUTING FLAG. DTMF: GENERATE SLIC DTMF EVENT. STORE DIGIT IN RAM 65 |
| 511 | SLIC OFF-HOOK EVENT | SET SLIC_IN_USE FLAG IN RAM 65. IF INCOMING CALL FLAG: GENERATE CONNECT AUDIO MESSAGE TO SLIC 80. SEND "ANSWER" CELL PHONE KEY TO WIRELESS INTERFACE 64. IF NOT INCOMING CALL FLAG: CHECK RAM 65 VOICE ROUTING FLAGS AND GENERATE LOCAL_CELL OR GLOBAL_CELL EVENT. |
| 512 | SLIC ON-HOOK EVENT | GENERATE DISCONNECT AUDIO MESSAGE TO SLIC 80. IF PASS THROUGH SEND DISCONNECTAUDIO_CELL PCM MSG AND FREE_CELL PCM MSG TO COMMON MEDIUM INTERFACE 66 ELSE SEND "END" KEY TO WIRELESS INTERFACE 64. RESET SLIC IN USE FLAG IN RAM 65. |
| 513 | SLIC DTMF EVENT | IF NO AUDIO CONNECTION CHECK FOR PROGRAMMING CODES AND IF NO AUDIO CONNECTION:RESET DIGIT TIMEOUT TIMER. IF PASS THROUGH GENERATE DIGITSDIALED_SLIC PCM MESSAGE WITH DTMF DATA ELSE SEND KEY PRESS MESSAGE TO WIRELESS INTERFACE 64 WITH DTMF DATA STORED IN RAM 65. |
| 514 | DIGIT TIMEOUT EVENT | SEND CONNECT AUDIO MSG TO SLIC 80. IF PASS THROUGH FLAG IS SET IN RAM 65 GENERATE "SEND" KEY TO REMOTE CELL VIA PCM SEND KEY COMMAND, ELSE GENERATE "SEND" KEY TO WIRELESS INTERFACE 64. |
| 515 | LOCAL_CELL EVENT | SENT TONE ON MESSAGE TO SLIC 80 WITH DIAL TONE DATA. |
| 516 | GLOBAL_CELL EVENT | GENERATE PCM COMMAND TO QUERY FOR AN AVAILABLE WIRELESS INTERFACE, IF ACK, STORE SOURCE FIELD IN RAM 65 AND GENERATE CONTROL CELL PCM MESSGE. IF ACK GENERATE CONNECT EVENT. IF NACK FOR EITHER MSG, GENERATE CONNECT FAIL EVENT. |

FIG. 7A

| | | |
|---|---|---|
| 520 | CELL INTERRUPT | READ SERIAL DATA, COPY INTO RAM 65. CHECK AGAINST LOOKUP TABLE TO DETERMINE SOURCE: RINGING: GENERATE CELL INCOMING CALL EVENT. SET CELL IN USE FLAG. CHECK PROGRAMMING TABLES IN RAM 65 AND SET LOCAL_SLIC OR GLOBAL_SLIC VOICE ROUTING FLAG. CLID: GENERATE CELL CLID DATA EVENT. CALL CONTROL: GENERATE CELL CALL CONTROL EVENT (CALL PROGRESS TONES, CALLER ID, FAR END DISCONNECT ETC.) |
| 521 | CELL INCOMING CALL EVENT | IF LOCAL_SLIC FLAG IS SET IN RAM 65: IF SLIC_IN_USE FLAG IS NOT SET, GENERATE RING ON MSG TO SLIC 80. SET INCOMING CALL FLAG IN RAM 65. IF SLIC_IN_USE FLAG IS SET, RETURN A SLIC BUSY MESSAGE TO WIRELESS INTERFACE 64. IF GLOBAL_SLIC FLAG IS SET IN RAM 65: SEND PCM QUERY SLIC MESSAGE TO COMMON MEDIUM INTERFACE 66. IF ACK THEN SEND PCM CONTROL SLIC. IF ACK THEN SEND PCM GEN_RING MSG. IF NACK TO ANY THEN SEND BUSY MSG TO WIRELESS INTERFACE 64. |
| 522 | CELL CLID DATA EVENT | STORE CLID DATA IN RAM 65. IF GLOBAL_SLIC FLAG IS SET IN RAM 65: SEND PCM SEND_CLID MSG TO COMMON MEDIUM INTERFACE 66 TO TRANSMIT CLID DATA STORED IN RAM 65. IF LOCAL_SLIC FLAG IS SET: SEND SERIES OF TONE ON-OFF COMMANDS TO SLIC TO TRANSMIT CLID DATA STORED IN RAM 65 TO SLIC 80 IN FSK FORMAT (SERIES OF 1200/2200 Hz TONES AT 1200 BITS/SECOND) |
| 523 | CELL CALL CONTROL EVENT WITH DATA | IF CELL ON HOOK MSG, GENERATE DISCONNECT AUDIO MSG TO SLIC 80. IF OTHER CALL CONTROL EVENTS (CALL PROGRESS TONES ETC) GENERATE APPROPRIATE TONE ON COMMANDS TO SLIC 80 FOR ANALOG EQUIVALENT TONE (BUSY, OVERFLOW, CAS, ETC) |
| 524 | CONNECT EVENT | SET PASS TRHOUGH FLAG IN RAM 65. SEND TONE ON MESSAGE TO SLIC 80 WITH DIAL TONE DATA. |
| 525 | CONNECT FAIL EVENT | SEND TONE ON MSG WITH RECALL TONE DATA TO SLIC 80 |

FIG. 7B

| | | |
|---|---|---|
| 530 | PCM CELL CALL CONTROL EVENT WITH DATA | IF PASS THROUGH FLAG IS SET IN RAM 65: IF PCM CELL ON HOOK MSG, GENERATE DISCONNECT AUDIO MSG TO SLIC 80. IF OTHER CALL CONTROL EVENTS (CALL PROGRESS TONES ETC) GENERATE APPROPRIATE TONE ON COMMANDS TO SLIC 80 FOR ANALOG EQUIVALENT TONE (BUSY, OVERFLOW, CAS, ETC) |
| 531 | PCM SLIC CALL CONTROL EVENTS WITH DATA | IF PASS THROUGH FLAG IS SET IN RAM 65: IF PCM SLIC ON HOOK MSG, GENERATE SEND "END" KEY TO WIRELESS INTERFACE 64. IF OTHER CALL-CONTROL EVENTS, GENERATE APPROPRIATE COMMANDS TO WIRELESS INTERFACE 64 FOR CELLULAR EQUIVALENT MESSAGE. |
| 532 | PCM LINE STATUS SLIC | IF OFF-HOOK SEND PCM CONNECT AUDIO SLIC MSG TO COMMON MEDIUM INTERFACE 66. SET PASS THROUGH FLAG IN RAM 65 |
| 533 | PCM QUERY SLIC MSG | SEND PCM QUERY SLIC ACK/NACK DEPENDING ON STATE OF SLIC_IN_USE FLAG IN RAM 65 |
| 534 | PCM MSGS | ALL PCM MESSAGES LISTED IN PCM SECTION ARE ACCEPTED BY THE MICROPROCESSOR AND CONVERTED TO CELL OR SLIC EQUIVALENTS. |

FIG. 7C

COMMUNICATIONS UNIT, SYSTEM AND METHODS FOR PROVIDING MULTIPLE ACCESS TO A WIRELESS TRANSCEIVER

BACKGROUND OF THE INVENTION

1. Field of Invention

This invention relates to wireless communication and more particularly to a communications unit, system and methods for providing multiple access to a wireless transceiver and/or transceivers.

2. Description of Related Art

There has been a rapid proliferation of wireless telephone usage in recent years. Many wireless telephone service providers are offering wireless telephone services at rates less than conventional land line services. Many people have wireless telephones and find themselves paying for both land line and wireless telephone services when they only need one or the other service, to gain access to the public switched telephone network.

While it is possible to simply do away with a conventional land line and substitute a single wireless telephone, many homes and offices have more than one wireless and/or conventional landline telephone. However, multiple users access to a single wireless handset is not readily facilitated by conventional systems. Wireless telephones or handsets are generally not designed to be used as a shared resource. Consequently, usually, only a single wireless telephone has access to subscribed wireless telephone services.

U.S. Pat. No. 4,775,997, discloses a standard telephone connected to an interface system and a wireless transceiver to permit a standard telephone to make a wireless telephone call. Communication between the standard telephone lines however, appears to be facilitated by a Key System Unit, which requires additional equipment and presents additional complexity and cost. Additionally communication between the separate telephone lines is not facilitated.

What would be desirable therefore is a way of making a wireless handset a shared resource and a way of modularly expanding the number of communications appliances which have access to a wireless transceiver or a plurality of wireless transceivers.

SUMMARY OF THE INVENTION

The present invention addresses the above need by providing a communications unit comprising a first wireless transceiver port operable to communicate with a first wireless transceiver operable to conduct wireless communications with a wireless base station and a first expansion interface in communication with the first wireless transceiver port and operable to communicate with a second communications unit on a plurality of communications channels, to permit the second communications unit to access the first wireless transceiver.

Effectively, a plurality of communications units of the type described above may be connected together to create a system for providing multiple access to a wireless transceiver, where the wireless transceiver may be on any of the so connected communications units. Using a system of this type, users may add additional communications appliances and/or additional wireless communications paths to the system. Thus, the system is expandable and contractible and completely eliminates the need to connect communications appliances to land lines.

In one embodiment the first expansion interface is operable to conduct communications with the second communications unit on time multiplexed channels. Alternatively, such communications may be conducted on frequency multiplexed channels.

Preferably, the first wireless transceiver port and the first expansion interface are provided on a common base or module. In one embodiment, the first wireless transceiver port includes a receptacle operable to receive and hold a wireless telephone such that the wireless telephone may simply be placed in the receptacle to facilitate communications with the first wireless transceiver port and, perhaps to facilitate charging of the wireless telephone. The first wireless transceiver port is preferably operable to communicate with a data interface on a wireless telephone.

Preferably, the first expansion interface is operable to conduct simultaneous communications with other communications units using the plurality of communications channels.

In one embodiment, the communications unit includes a first communications appliance interface operable to communicate with at least one of the first wireless transceiver and the first expansion interface. Such a communications appliance interface may include a telephone interface. Preferably the first communications appliance interface is included within the same common base as the first wireless transceiver port and the first expansion interface.

The first expansion interface and the first communications appliance interface may be selectively operable to use the first wireless communications interface. The first expansion interface may simultaneously support independent communications on the first appliance interface and with the wireless transceiver.

In one embodiment, the first expansion port is programmable by commands received at the communications appliance interface or from at least one of the first wireless interface and any communications unit connected to the first communications unit. Alternatively, the first expansion port may be programmable by commands received at a special programming interface.

The programming commands may cause the first wireless interface to selectively communicate with one of a plurality of communications units in the system which are operable to communicate with the first expansion interface, and preferably the first communications appliance port is programmable by commands received from a communications appliance in communication with the first communications appliance port.

In one embodiment, the first expansion interface includes a bus interface and more particularly such bus interface may include a pulse code modulation bus interface.

In accordance with another aspect of the invention there is provided a method of providing multiple access to a wireless transceiver, the method comprising supporting communications through a first expansion interface, on one of a plurality of communications channels, between a first wireless transceiver port of a first communications unit and a second communications unit, where the first wireless transceiver port is operable to communicate with a first wireless transceiver operable to conduct wireless communications with a wireless base station.

In accordance with another aspect of the invention there is provided a method of providing multiple access to a wireless transceiver, the method comprising supporting communications through a first expansion interface, on one of a plurality of communications channels, between a first wireless transceiver port of a first communications unit and a plurality of communications units, where the first wireless transceiver port is operable to communicate with a first wireless transceiver operable to conduct wireless communications with a wireless base station.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 3 is a schematic representation of pulse code modulation (PCM) time slots in which information is transferred between the communications units of FIG. 1;

FIG. 4 is a tabular representation of programming commands and responses executed by the processor circuit shown in FIG. 2;

FIG. 5 is a schematic representation of a message format in which commands are conveyed in the time slots shown in FIG. 3;

FIGS. 6A to 6C are a tabular representation of exemplary commands which are transmitted using the message format shown in FIG. 5;

FIGS. 7A to 7C are a tabular representation of event codes and actions undertaken by the processor circuit shown in FIG. 2, in response to corresponding event codes.

DETAILED DESCRIPTION

Figure 1:
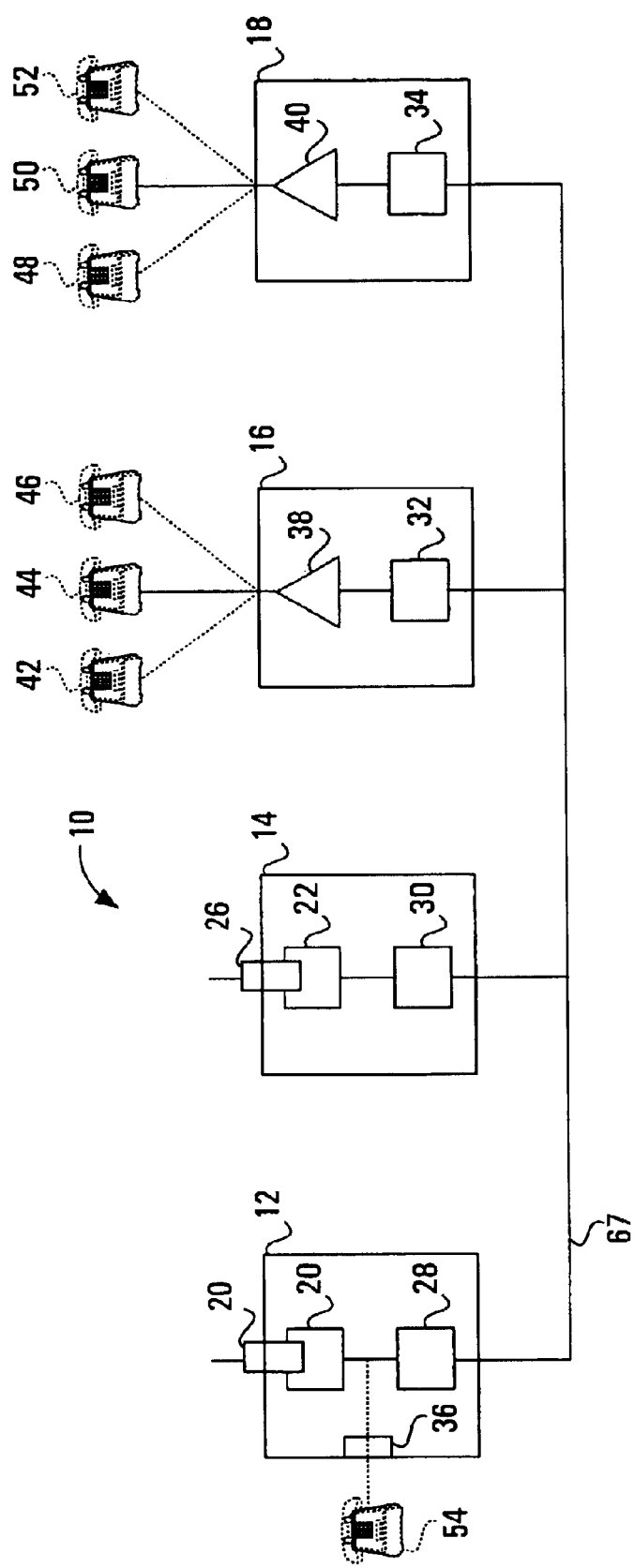
FIG. 1 is schematic representation of a system according to a first embodiment of the invention.

Referring to FIG. 1, a system for providing multiple access to a wireless transceiver is shown generally at 10. In the embodiment shown, the system comprises a plurality of communications units 12, 14, 16, and 18 and could include many more, or fewer communications units.

At least one of the communications units, has a wireless transceiver port and in this embodiment units 12 and 14 have first and second wireless transceiver ports 20 and 22 respectively. All of the communications units may have wireless transceiver ports, if desired, however, only two are shown here to show the diversity of the system as will become apparent below.

Each wireless transceiver port 20 and 22 is operable to communicate with a respective wireless transceiver 24 and 26 respectively and such wireless transceivers are of the type that is operable to conduct wireless communications with a wireless base station. The wireless transceivers 24 and 26 may be first and second wireless telephones, for example. In general, the wireless transceivers may be of the type that operate with GSM, AMPS, Time Division Multiple Access (TDMA), Code Division Multiple Access (CDMA), PCS or any other type of wireless/PCS protocol. Communication with a wireless telephone may be achieved through a data connector now common on wireless telephones. A "pigtail" connector, (not shown) for example, may be connected between the data connector on the wireless telephone and the wireless transceiver port 20. Or, the wireless transceiver port 20 may be provided in a base or housing such as a wireless telephone charger stand which may have a receptacle for receiving and holding a wireless telephone and for making connections with the wireless telephone, while it is in the receptacle. Or, communications may be established between the wireless telephone and the wireless transceiver 24 using a wireless RF link such as provided under the trademark BLUETOOTH™ owned by Telefonaktiebolaget L.M. Ericsson of Sweden.

Each communications unit also has an expansion interface to permit it to communicate with one or more of the other communications units. Thus, the first communications unit 12 has a first expansion interface 28 and the remaining communications units 14, 16, and 18 have second, third and fourth expansion interfaces 30, 32, and 34 respectively. The first expansion interface 28 is in communication with the first wireless transceiver port 20 and is operable to communicate with the second, third or fourth or any further communications units which may be connected, on a plurality of communications channels, to permit the second, or any other communications unit in communication with the first expansion interface to access the first wireless transceiver 24. Similarly, the second expansion interface 30 is operable to communicate with the first, third or fourth or any further communications units which may be connected, on a plurality of communications channels, to permit the first, or any other communications unit in communication with the second expansion interface to access the second wireless transceiver 26.

While each communications unit 12, 14, 16 and 18 has a respective expansion interface 28, 30, 32, 34 respectively, in order to make it compatible with the system, each communications unit may have a different type of or multiple types of communications interface connected to its expansion interface. For example, communications units 12 and 14 have first and second wireless transceiver ports 20 and 22 connected to the first and second expansion interfaces 28 and 30 respectively. The first communications unit 12 however, also has a first communications appliance interface 36 in communication with at least one of the wireless transceiver port 20 and the first expansion interface 28 and the third and fourth communications units 16 and 18, have no wireless transceiver ports, but rather have second and third communications appliance interfaces 38 and 40 respectively, connected to the third and fourth expansion interfaces 32 and 34, respectively.

The communications appliance interfaces 36, 38 and 40 of the first, third and fourth communications units 12, 16 and 18 are operable to communicate with communications appliances such as an analog telephone, answering machine, fax machine, modem, or any other communications appliance which normally is operable to be connected to a public switched telephone network subscriber loop or private telephone network subscriber loop. Any communications appliance interface 36, 38, 40 may alternatively include an IP network protocol interface, to provide for voice over IP, or data over IP, or Ethernet sessions, for example. Or any communications appliance interface may have a universal serial bus interface and connector, for example. Furthermore, any communications appliance interface used with this system, may have multiple communications appliance drive capability and may permit a plurality of communications appliances, where appropriate, to connect to or be placed in communication with a single communications appliance interface. The third and fourth communications units 16 and 18, for example are shown with each having three extension telephones 42, 44, 46 and 48, 50, 52 connected to their respective communications appliance interfaces 38 and 40.

Effectively, the communications units of the system shown in FIG. 1 cooperate to permit any communications appliance in communication with any communications unit to access any of the two wireless transceiver ports 20 and 22 in the system. The expansion interfaces 28, 30, 32, 34 on each communications unit 12, 14, 16, 18 permit additional communications units having such expansion interfaces to be connected to the system, thus facilitating easy expansion of the system at any time. This may have particular use in residential or office situations where, for example, a single communications unit such as the first communications unit 12 may be purchased by a wireless services subscriber, as a substitute for conventional hard wired telephone service.

The user may connect or otherwise place a wireless handset, such as the first wireless transceiver 24, in communication with the first wireless transceiver port 20 and the user may connect an existing land line type telephone 54 to the communications appliance interface 36 whereupon the telephone 54 may access the wireless transceiver 24 to make or receive a telephone call, without the use of a landline. If the user wishes to have extension telephones, such as in other rooms of a residence, the user need only purchase a further communications unit such as the third communications unit 16, place the respective expansion interfaces 32 and 28 in communication with each other and connect the desired number of extension telephones 42, 44 and 46 to the second communications appliance interface 38, to permit more than one communications appliance interface to have access to the first wireless transceiver 24.

Should the user wish to permit the communications appliances to have access to more than one wireless telephone, the user need only purchase a communications unit such as the second communications unit 14, which has a second wireless transceiver port 22, which may be placed in communication with a second wireless transceiver 26, such as a second wireless telephone. The system 10 may be configured to permit any of the communications appliances 42, 44, 46, 48, 50, 52 and 54 to access any of the first and second wireless transceivers 24 and 26 and the system may be configured to permit a telephone or communications appliance to be in communication with multiple wireless transceivers simultaneously, to facilitate a conference call, for example. Furthermore, the modularity of the communications units and the expansion port on each unit permits units of specific types to be connected into the system, to meet the user's needs for additional wireless channel access and/or additional communications appliance access.

Figure 2:
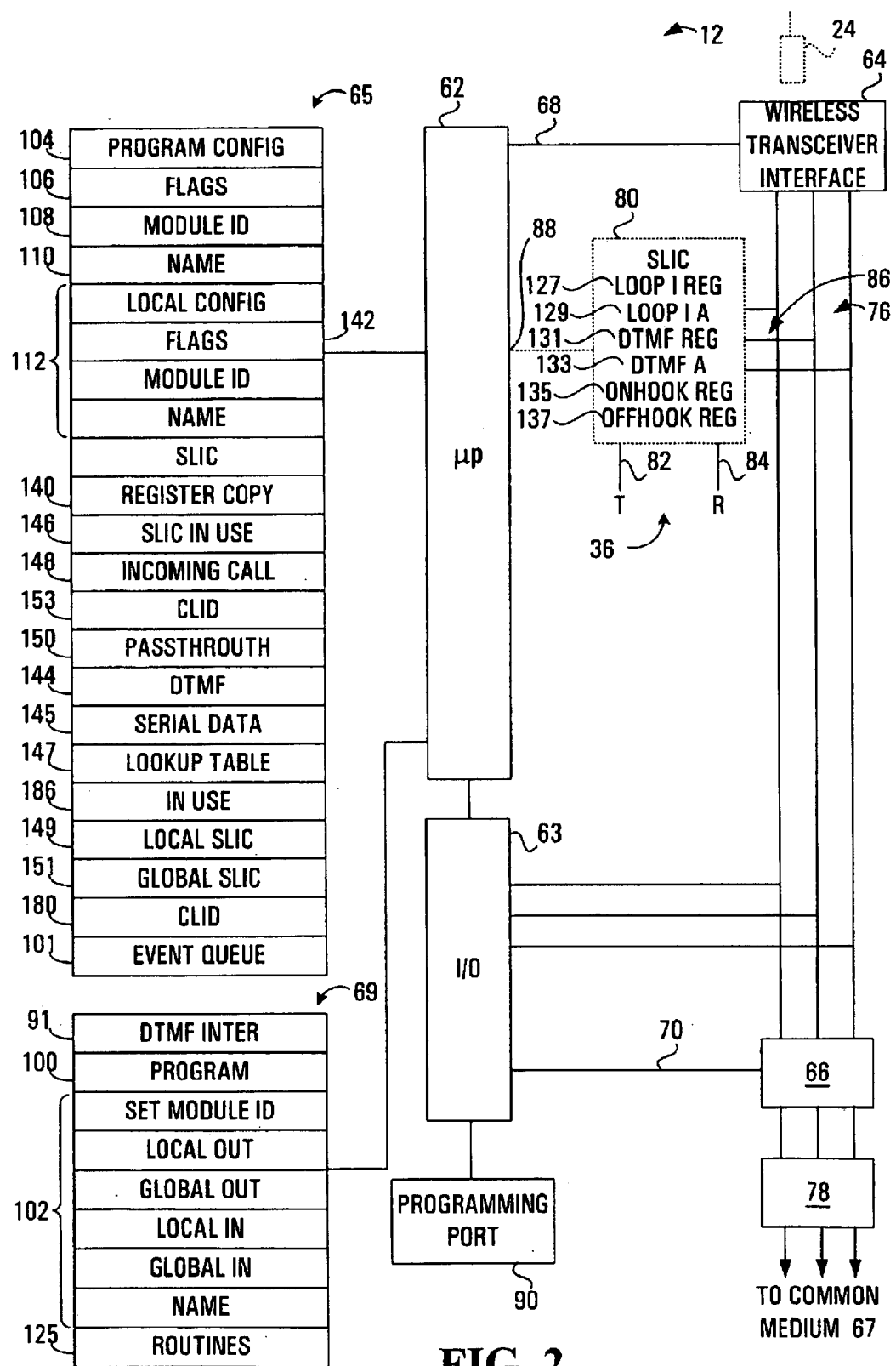
FIG. 2 is a block diagram of a processor circuit in a communications unit of the system shown in FIG. 1.

In order to provide the above functionality, a representative communications unit, such as the first communications unit 12 is shown schematically at 12 in FIG. 2. In this embodiment, the first communications unit 12 is comprised of a processor circuit 60 including a microprocessor 62 in communication with an I/O port 63, RAM 65 and program memory 69 and further in communication with a wireless transceiver interface 64 and a common medium interface 66, which provides for communications with other communications units in the system shown in FIG. 1. The common medium interface 66 is in communication with a common medium 61 which may be a hard-wired line such as single or multiple pair copper wire or coaxial cable, or it may be a wireless medium, for example. In this embodiment, the common medium is a hard-wired line supporting a Pulse Code Modulation (PCM) bus. Consequently, the common medium interface 66 is a PCM bus buffer.

The microprocessor 62 communicates with the wireless transceiver interface 64 and the common medium interface 66 through first and second sets of control signal lines 68 and 70. Both the wireless transceiver interface 64 and the PCM bus buffer have local PCM bus interfaces 72 and 74 respectively which are connected to each other to form a local PCM bus 76, within the communications unit 12. In this embodiment, effectively, the common medium interface 66, simply buffers PCM bus signals which are provided to and from an expansion connector 78 to which other communications units 14, 16 and 18 of the system 10 can be connected.

Still referring to FIG. 2, in this embodiment, the external and internal PCM buses 67, 76 are serial buses. It will be appreciated that other types of buses such as parallel buses may be employed, or other serial buses may be employed.

Referring to FIG. 3, the PCM bus is compatible with a PCM bus protocol which provides a plurality of timeslots 0–127 which act as time multiplexed channels during which transmissions may be transmitted and received on the bus. Referring back to FIG. 2, effectively, the microprocessor 62 is programmed to send control signals on signal lines 68 and 70 to the transceiver interface 64 and to the common medium interface 66 respectively, to selectively permit the transceiver interface 64 to transmit or receive payload data to/from the bus 76 and hence to/from the common medium 67, during one or more specific timeslots of the PCM bus protocol. Thus, if, for example, PCM data representing a voice transmission from, say the third communications unit 16 shown in FIG. 1, is placed on the common medium 67 during timeslot 1, and the microprocessor 62 of the first communications unit is programmed to open the common medium interface 66 during timeslot 1 to permit the data to be presented to the transceiver interface 64. The transceiver interface 64 receives such data and provides it to the wireless transceiver 24 connected thereto, for transmission to a wireless base station. A similar procedure occurs in the reverse direction to permit data received from the base station to be communicated to the third communications unit 16. It is important to note that the configuration shown in FIG. 2, permits the microprocessor 62 to simply open the expansion connector 78 at the appropriate time(s) to permit data on the common medium 67 to be communicated directly to the wireless transceiver interface 64 and hence to the wireless transceiver 24.

Referring back to FIG. 1, by assigning respective communications appliance interfaces 36, 38, 40 and wireless transceiver ports 20, 22 on the communications units 12, 14, 16, 18 each a different timeslot in which to conduct its communications, different communications appliance interfaces and wireless transceiver ports on the various communications units may be selectively matched with communications appliance interfaces and wireless transceiver ports on other communications units, thereby permitting multiple access by a plurality of communications devices in communication with different communications units, to any given wireless transceiver port and wireless transceiver. Effectively, the timeslots of the PCM protocol provide multiple channels by which communications appliances at any communications unit can access the first or second wireless transceivers 24, 26. Simply by connecting another communications unit to the external wiring, and assigning timeslots, additional communications appliances may have similar access, and thus the system is expandable and contractible.

The timeslots effectively act as separate time multiplexed communications channels. Alternatively, separate frequency division multiplexed channels may be provided, where a separate carrier frequency may be assigned to a communications appliance/wireless transceiver pair for a period of time during which a call is in progress and/or during which control communications occur.

Referring back to FIG. 2, where the communications unit 12 has a communications appliance interface such as 36 in FIG. 1, such an interface may be provided by a subscriber line interface circuit (SLIC) 80. A suitable circuit of this type is available under part No. Si3210 ProSLIC™ from Silicon Laboratories Inc. of Austin Tex., USA. This interface circuit provides tip and ring connections 82 and 84 for direct connection to a communications appliance and a PCM bus interface shown generally at 86. The circuit also receives signals and transmits signals on control signal lines 88, for communication with the microprocessor 62.

Effectively, the microprocessor 62, produces signals on control signal lines 68, 88 and 70 to control the operation of the transceiver interface 64, the SLIC 80 and the common medium interface 66, to selectively permit the transceiver interface 64 to communicate with the SLIC 80 and/or the common medium interface 66 during appropriate timeslots to permit the transceiver interface 64 to transmit or receive data to or from either the SLIC 80 or the common medium interface 66, or both. In addition, the microprocessor 62 may control the common medium interface 66 and the SLIC 80 to cooperate in the same timeslot to permit a communications appliance in communication with the communications appliance interface 36 to conduct communications through the PCM bus on the common medium, with a communications appliance of another communications unit.

The selection of a timeslot in which a communications appliance interface or wireless transceiver port of any communication interface can conduct communications with another communications unit depends upon the calls which are to be supported by respective communications units. For example, a communication appliance connected to the third communications unit 16 may be required to establish communications with the wireless transceiver port 20 or the communications appliance interface 36 of the first communications unit 12. In order to do this and to select which termination to use the microprocessor 62 in each communications unit 12, 16 is programmed to be responsive to programming commands which may be received at the wireless transceiver interface 64, the communications appliance interface 36, the PCM bus 76, or a separate programming port 90. In the case of the first communications unit, for example, programming commands may be produced at the communications appliance interface 36 in response to different series of Dual Tone MultiFrequency (DTMF) tones generated by a communications appliance such as a telephone, in communication with the communications appliance interface. In response to the generation of such a series, the SLIC 80 provides signals to the microprocessor 62 to indicate individual DTMF tones received. The microprocessor 62 is programmed with a DTMF tone sequence interpreter 91 which may simply gather a plurality of DTMF tone indications and then test sequences thereof to determine whether one of a plurality of pre-defined tone sequences has been received. If one is received, then the tone sequence interpreter 91 directs the microprocessor 62 to a lookup table such as shown in FIG. 4, which directs it to associated programming routines 102.

Programming routines 102 associated with each DTMF tone sequence are stored in program memory 69. Referring to the table shown in FIG. 4, and the block diagram of FIG. 2, as indicated at 103, detection of the tone sequence *90 by the DTMF interpreter directs the processor 62 to enter a program mode. This mode is entered by running a program routine 100 which directs the processor 62 to determine whether or not a valid tone sequence has been received. When such a sequence is received, the processor 62 branches to the associated programming routine 102. Generally, these routines may be summarized in one step each, the general functionality of each routine being indicated in the response column 105 of the table shown in FIG. 4. Effectively, these routines 102 direct the microprocessor 62 to store in the RAM 65 a programming configuration 104 including flags 106, module identifications 108 and names 110. This programming configuration is set in response to DTMF code sequences received at any interface on the communications unit 12.

The routines 102 shown in FIG. 2 are by no means the only routines that could be available in response to DTMF tone sequences. More routines could be added to permit features such as those found on key systems, for example, to be made available to different communications appliances. Also, alternatively, programming, or more particularly, setting the flags, identifications and names may be effected through the use of a keypad and LCD (not shown), for example. Or, flash memory (not shown) could be provided with stored prompts for prompting a user to enter IVR commands to effect programming.

Once programming configuration information of the type described above is entered and stored by the microprocessor 62, the microprocessor 62 is directed to read the module identification 108 to determine which communications unit is to receive the programming information. If the module identification information 108 identifies the communications unit in which the microprocessor 62 is located, the microprocessor 62 simply copies the programming information into a local configuration memory 112. Otherwise, the microprocessor 62 transmits the programming information to the other units in communication with the common medium 67, in a message format as shown in FIG. 5.

Referring to FIG. 5, the message format by which commands and data are communicated between communications units is shown generally at 120. Messages include a source field 122, a destination field 124, a command field 126, a length field 128, a data field 130 and a checksum field 132. The source field 122 is used to convey the identity of the source of the message or the communications unit from which the message is being transmitted. The destination field 124 is used to identify the communications unit for which the message is intended. The command field 126 is used to tell the destination communications unit what to do with the message. The length field 128 is used to indicate how many bytes comprise the message. The data field 130 is used to convey data such as a copy of the programming information representing configuration data for the destination communications unit. The checksum field 132 is used in the usual way to provide for error checking.

Exemplary messages illustrating various commands are shown generally at in FIGS. 6A–6C. The microprocessor 62 of each communications unit 12, 14, 16, 18 is capable of producing and interpreting commands of the type shown, to effect communications between different communications units in the system 10. Any of the commands shown may be communicated to any other communications unit in the system 10 by placing successive bytes of the command on the communications medium 67 during a particular timeslot of the PCM protocol. In the embodiment described, respective bytes of commands are transmitted in successive occurrences of timeslot 0, until the complete message has been transmitted. All other communications units "listen" to the transmission, accumulating bytes from timeslot 0 until a valid command is identified by the succession of bytes received. When such a valid command has been properly received, each communications unit 12, 14, 16, 18 determines whether or not the command is intended for itself, by reading the destination field 124 of the command. When it is determined that it is the recipient of the command, the microprocessor 62 in the recipient communications unit transmits an acknowledge command back to the source communications unit. Some commands may be intended for receipt by all communications units and those commands may be identified by a destination field 124 having a pre-defined value such as 00H, whereupon all communications units treat the received command as their own, and one or more communications units transmit acknowledgement commands to the source unit.

In the above manner, each of the communications units 12, 14, 16, 18 can communicate with each other by transmitting commands of the type shown in FIGS. 6A–6C on timeslot 0 of the PCM protocol. In this embodiment time slot 0 is arbitrated to avoid contention.

The commands shown in FIGS. 6A–6C are generated by respective microprocessors of respective communications units in response to certain actions being detected by the communications appliance interface 36 and/or the wireless transceiver port 20 at any given communications unit. Such actions may include an off-hook condition, DTMF tones, loss of loop current, detection of a ring indication message from a wireless network, detection of Calling Line Identification (CLID) information from the wireless network, and detection of call control and call progress signals from the wireless network, for example. On detection of these and other actions by the communications appliance interface 36 and/or the wireless transceiver port 20, the detecting interface 36 communicates corresponding signals to the microprocessor 62, causing it to run a routine from one of a collection of routines 125 shown in FIG. 2, associated with such signals. In addition, the communications appliance interface 36 and/or the wireless interface 20 may perform some actions of its own.

For example, in the first communications unit 12, referring to FIG. 2, if the SLIC 80 detects loop current at the communications appliance interface 36, the SLIC 80 internally stops any ringing tone if one is occurring, stores a loop current value in a local register 127 sets a loop current flag in a local register 129 and sets an on hook flag in a local register 135, while resetting an off hook flag in a local register 137. Then, the SLIC 80 generates an interrupt signal to the microprocessor 62 on signal lines 88. Or, if the SLIC 80 detects a DTMF signal being produced at the communications appliance interface 36, the SLIC 80 decodes the DTMF signal and stores a corresponding DTMF digit in a local register 131 and then sets a digit detected flag in a local register 133. The SLIC then generates an interrupt signal to the microprocessor 62.

If the SLIC 80 detects a loss of loop current at the communications appliance interface 36, the SLIC 80 stores a loop current value in the local register 127, clears the loop current flag in the local register 129 and sets the off hook flag in the local register 137, while resetting the on hook flag in the local register 135. The SLIC 80 then generates an interrupt signal to the microprocessor 62.

The SLIC 80 is also responsive to signals received from the microprocessor 62. For example, the microprocessor 62 may present a "ring on" signal to the SLIC 80, in which case the SLIC 80 generates a ringing pattern at the communication appliance interface 36, if no loop current is detected at the communications appliance interface 36. Similarly, if the microprocessor 62 presents a "ring off" signal to the SLIC 80, the SLIC 80 stops any ringing pattern generation. If the microprocessor 62 provides a "tone on" signal, the SLIC 80 generates the requested tone. A requested tone may be a DTMF, frequency shift keying (FSK), Customer Premise Equipment (CPE) alert signal (CAS) or a call progress (CP) signal, for example. If a "tone off" message is detected from the microprocessor 62, the SLIC 80 stops generating the requested tone. If the microprocessor 62 presents a "connect audio" message with channel data (i.e., time slot identification) to the SLIC 80, the SLIC turns on its codec in the PCM timeslot corresponding to the data channel information included in the "connect audio" message. The codec in the SLIC 80 determines the direction of data during the timeslot and effectively forwards audio data to and from the communications appliance interface 36 during the indicated timeslot. If the microprocessor 62 should present a "disconnect audio" message, the SLIC 80 turns off the codec therein.

Actions at the wireless interface 64 may include detection of a ring indication message from the wireless network. In response, the wireless transceiver interface 64 generates a wireless interrupt signal to the microprocessor 62, on signal line 68 and provides a ringing message to the microprocessor 62. If the wireless transceiver interface 64 should receive calling line identification data from the wireless transceiver connected thereto, the wireless transceiver interface 64 generates a wireless interrupt to the microprocessor 62, along with a CLID message including CLID data. If the wireless transceiver interface 64 detects call control and call progress signals received from the wireless transceiver, the wireless transceiver interface 64 generates a wireless interrupt to the microprocessor 62 and provides a call progress message thereto.

The wireless transceiver interface 64 may also receive instructions from the microprocessor 62, such as an instruction representing a send key message, along with channel data. In response, the wireless transceiver interface 64 opens a voice path to the wireless network through the wireless transceiver 24 connected thereto, effectively providing the wireless transceiver interface 64 access to the PCM bus 76 during a timeslot corresponding to the indicated channel data received in the send key message instruction. At the same time, the wireless transceiver interface 64 communicates with the wireless transceiver 24 connected thereto to dial any stored digits.

In addition, the microprocessor 62 may provide DTMF key instructions to the wireless transceiver interface 64, in which case the wireless transceiver interface 64 communicates with the wireless transceiver 24 to display corresponding DTMF digits on an LCD of the wireless transceiver 24 and to store the DTMF digits in a local register (not shown) of the wireless transceiver 24 or dial the digits, if an audio path is already established. In addition, the microprocessor 62 may send an "end" key instruction to the wireless transceiver interface 64, causing it to disconnect any audio path by ceasing to place it in communication with the PCM bus 76 during the identified time slot.

From the foregoing, it will be appreciated that essentially the microprocessor 62 responds to interrupts produced by the SLIC 80 and interrupts produced by the wireless transceiver interface 64. To effect responses, the microprocessor 62 maintains an event queue 101 in which it receives event codes provided to it through interrupt vectors provided by the SLIC 80 and the wireless transceiver interface 64 and generated internally, by itself. Exemplary event codes and corresponding actions are indicated in tabular form in FIGS. 7A and 7B.

Effectively, the microprocessor 62 simply executes routines identified by event codes in the event queue 101, in the order in which the event codes are stored in the event queue. For example, in response to a SLIC interrupt event code 510, the microprocessor 62 enters an interrupt routine among the routines 125, in which it polls the flag and data registers 127, 129, 131, 133, 135 and 137 in the SLIC 80, and copies the contents of the these registers into a SLIC register area 140 in the RAM 65. Next, the microprocessor 62 checks the flags stored in the SLIC register area 140, against a lookup table (not shown) to determine the interrupt source. If the on hook flag 135 is set, a SLIC on hook event code 512 is generated and stored in the event queue 101. If the off hook flag 137 is set, a SLIC off hook event code 511 is generated and stored in the event queue 101. Next, the microprocessor 62 checks the local configuration 112 in the RAM 65 and sets local wireless or global wireless voice routing flags among the flags 142. If the interrupt from the SLIC 80 was caused by receipt of DTMF tones at the SLIC 80, as determined by the flags in the SLIC 80, the microprocessor 62 places a SLIC DTMF event code 513 in the event queue 101 and stores DTMF digits in a DTMF buffer 144 in the RAM 65.

When the microprocessor 62 receives a SLIC off hook event code 511 in the event queue 101, it sets a SLIC in use flag 146 active in the RAM 65. If an incoming call flag 148 in the RAM is set, then the microprocessor 62 provides connect audio signals to the SLIC 80 and provides answer wireless phone signals to the wireless transceiver interface 64. If the incoming call flag 148 is not set, then the microprocessor 62 checks voice routing flags among the flags 142 in the RAM and generates a local wireless or global wireless event code 515 and 516 respectively and stores it in the event queue 101.

In response to a SLIC on hook event code 512 in the event queue 101, the microprocessor 62 provides disconnect audio signals to the SLIC 80 on control lines 88. If a pass through flag 150 in the RAM 65 is set a disconnect audio wireless PCM message 152 and free wireless PCM message 154 is communicated in slot 0, to the wireless transceiver interface in a remote communications unit. Otherwise, if the pass through flag 150 is not set, end key signals are sent to the first wireless transceiver interface 64. Then, the microprocessor 62 resets the SLIC in use flag 146 in the RAM.

In response to a SLIC DTMF event code 513, the microprocessor 62 determines whether an audio connection has been established by reading the SLIC in use flag 146, and if it has not been set, to run the tone sequence interpreter 91 for use in programming the microprocessor 62 as described above. In addition, the microprocessor 62 is directed to reset a digit time out timer. If the pass through flag 150 is set, the microprocessor 62 generates a digit dialed SLIC PCM command (156 in FIG. 6C) with DTMF data and sends it to a remote wireless transceiver interface over the common medium 67. If the pass through flag 150 is not set, then the microprocessor 62 sends key press signals to the wireless transceiver interface 64, along with DTMF data stored in the DTMF buffer 144.

Essentially, the pass through flag 150 indicates to the microprocessor 62 whether or not it should be placed in a pass through mode or in a non-pass through mode. In the pass through mode, all messages received by the microprocessor 62 from the wireless transceiver 64 or the SLIC 80 are converted by the microprocessor 62 into corresponding commands selected from the list of commands shown in FIGS. 6A and 6B and are transmitted on slot 0 of the PCM protocol. Similarly, commands received in slot 0 by a microprocessor 62 in the pass through mode and which are of the type for controlling the wireless interface or the SLIC 80 are converted by the microprocessor 62 into corresponding signals for controlling the wireless interface 64 and/or SLIC 80. In this way the microprocessor 62 in one communications unit can directly control the wireless and/or SLIC interfaces in another communications unit.

In response to a digit time out event code 514 in the event queue 101, the microprocessor 62 sends connect audio signals to the SLIC 80. If the pass through flag 150 is set, then the microprocessor 62 transmits a key press-wireless command (158 in FIG. 6C) on the common medium 67 for receipt by a wireless transceiver interface on another communications unit. If the pass through flag 150 is not set, then the microprocessor 62 generates a send key signal to the wireless interface 64 in the first communications unit 12.

In response to a local wireless event code 515 in the event queue 101, the microprocessor 62 transmits "tone on" signals to the SLIC 80, with dial tone data.

In response to a global wireless event code 516 in the event queue 101, the microprocessor 62 generates a query wireless command (160 in FIG. 6A) for transmission on the common medium 67, to query for an available wireless interface. If an acknowledgement command (162 in FIG. 6A) is received, then the contents of the source field 122 are stored in the RAM 65 and a control wireless PCM command (164 in FIG. 6A) is generated. If an acknowledgement (165 in FIG. 6A) is received, then a connect event code 524 is stored in the event queue 101. If no acknowledgement is received for either the query wireless or the control wireless command (160, 164 in FIG. 6A), a connect fail event code 525 is generated and stored in the event queue 101.

In response to a wireless interrupt code 520 in the event queue 101, the microprocessor 62 reads serial data from the wireless transceiver interface 64 and copies it into a serial data buffer 145 RAM 65. The serial data is checked against a lookup table 147 to determine the source of the serial data. If the serial data indicates ringing, then the microprocessor 62 generates a wireless incoming call event code 521 and stores it in the event queue 101. Then, the microprocessor 62 sets a "cell in use" flag 186 in the RAM 65 and checks the configuration table 112 in the RAM 65 and sets a local SLIC or global SLIC voice routing flag 149, or 151 in the RAM. If the wireless interrupt code was created in response to calling line identification information being received, then the microprocessor 62 generates a wireless CLID data event code 522 and stores it in the event queue 101. If the wireless interrupt code was created in response to a call control tone received at the wireless interface, then the microprocessor 62 generates a wireless call control event code 523 and stores it in the event queue 101.

In response to a wireless incoming call event code 521 in the event queue 101, the microprocessor 62 determines whether the local SLIC flag 149 is set in the RAM 65 and if so, then the processor 62 determines whether the SLIC in use flag 146 is not set and if so, provides "ring on" signals to the SLIC 80. At the same time, the incoming call flag 148 is set in the RAM 65. If the SLIC in use flag 146 is set, SLIC busy signals are provided to the wireless transceiver interface 64. If the global SLIC flag 142 is set in RAM 65, the microprocessor 62 sends a PCM query SLIC command (166 in FIG. 6A) on the common medium 67. If an acknowledgement command (168 in FIG. 6A) is received, then a PCM control SLIC command (170 in FIG. 6A) is transmitted. If an acknowledgement command (172 in FIG. 6A) is received, then a PCM generate ringing command (174 in FIG. 6A) is transmitted on the common medium 67. If no acknowledgement command (176 in FIG. 6A) is received to either message, then a busy indication is provided by the microprocessor 62 to wireless transceiver interface 64.

In response to a wireless CLID data event code 522 in the event queue 101, the microprocessor 62 stores calling line identification data in a CLID buffer 180 in the RAM 65. It then checks whether the global SLIC flag 151 is set and if so, transmits a PCM send CLID command (182 in FIG. 6B) on the common medium 67 to transmit calling line identification data stored in the CLID buffer 180 to a remote communications interface. If the local SLIC flag 149 is set, then the microprocessor 62 sends a series of tone on/off signals to the SLIC 80 to transmit CLID data stored in the CLID buffer 180 to the SLIC 80 in FSK format. This may be a series of 1200/2200 Hertz tones at 1200 bits per second, for example.

In response to a wireless call control event code 523 (with data) in the event queue 101, the microprocessor 62 determines from the data associated with event code, whether a wireless "on hook" message has been received from the transceiver interface 64 or from a remote transceiver, and provides audio disconnect signals to the SLIC 80. If other call control events (call progress tones, etc.) are indicated by the dates associated with the event code, then the microprocessor 62 generates appropriate "tone on" signals to the SLIC 80, to cause it to produce analog equivalent tones such as busy, overflow CAS, etc.

In response to a connect event code 524 in the event queue 101, the microprocessor 62 sets the pass through flag 150 in the RAM 65 and sends "tone on" signals to the SLIC 80, with dial tone data.

In response to a connect fail event code 525 in the event queue 101, the microprocessor 62 sends "tone on" signals with recall tone data to the SLIC 80.

In response to a PCM wireless call control event code 530, (with data), in the event queue 101, the microprocessor 62 determines whether the pass through flag 150 is set in the RAM 65. If so, then the data associated with the PCM wireless call control event code 530 is read to determine whether the event was caused by the remote wireless transceiver going on hook. If so, then the microprocessor 62 provides disconnect audio signals to the SLIC 80. If other call control events are identified by the data, such as call progress tones etc., the microprocessor 62 provides appropriate "tone on" commands to the SLIC 80, to cause it to produce analog equivalent tones such as busy, overflow, CAS, etc.

In response to a PCM SLIC call control event code 531 (with data) in the event queue 101, the microprocessor 62 determines whether the pass through flag 150 is set in the RAM 65. If so, then the data is read to determine whether the action which generated the event code is a remote SLIC going on hook. If so, then the processor 62 provides end key signals to the wireless transceiver interface 64. If other call control events are identified by the data, then the microprocessor 62 is directed to generate appropriate signals to the wireless transceiver interface 64, for wireless equivalent messaging.

In response to a PCM line status SLIC event code 532, the microprocessor 62 reads the SLIC register copy 140 to determine whether the SLIC detects an off hook condition and if so, the microprocessor 62 sends a PCM connect audio SLIC command 184 on the common medium 67 and sets the pass through flag 150 in the RAM 65.

In response to a PCM query SLIC message code 533 in the event queue 101, the microprocessor 62 sends a PCM query SLIC ACK/NACK COMMAND (168 in FIG. 6A) depending on the state of the SLIC in use flag 146 in the RAM 65.

In response to a PCM message code 534 in the event queue 101, the microprocessor 62 converts these messages to wireless or SLIC equivalent control signals.

Figure 8:
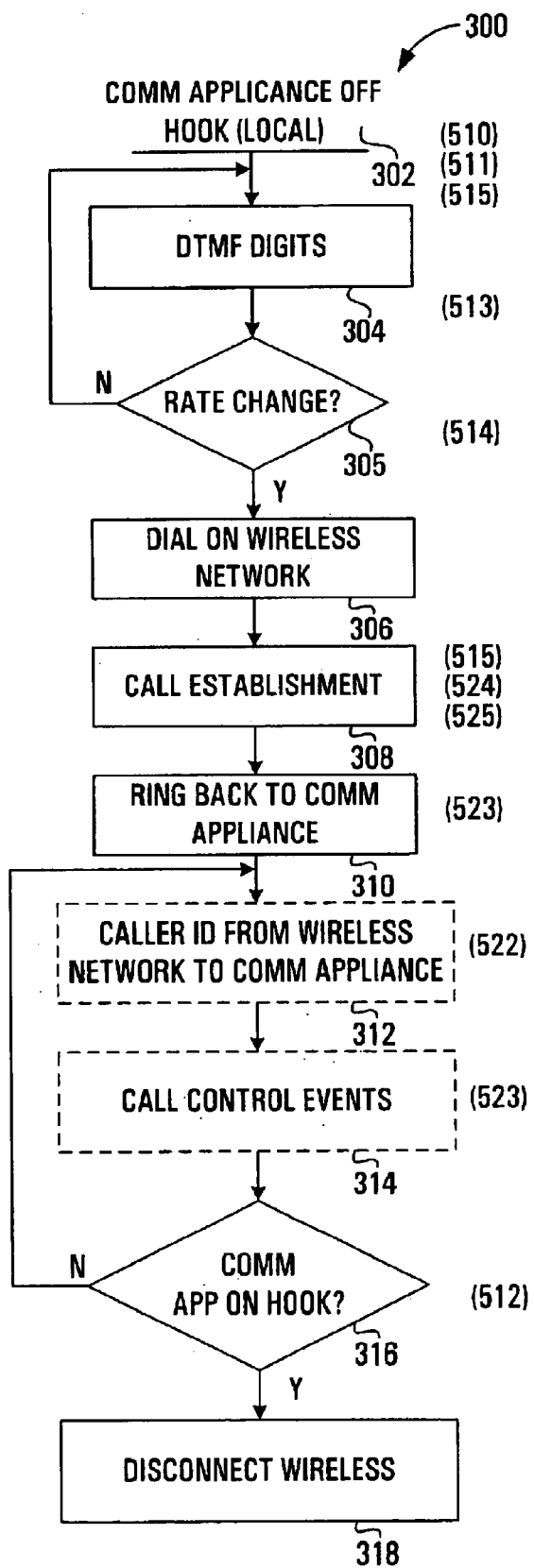
FIG. 8 is a flowchart of actions taken to establish an outgoing call from a communications appliance interface on a first communications unit of the system of FIG. 1, to a transceiver port on the same communications unit.

Outgoing Call From First Communications Appliance, Using First Wireless Transceiver Referring to FIG. 8, the mechanism by which an outgoing call is made, such as from the communications appliance 54 to the first transceiver 24 is shown generally at 300. In order to make a call of this type, at least the local outgoing access flag among the flags 142 must be pre-set active.

When the user of the communications appliance interface 54 shown in FIG. 1 takes the communications appliance 54 off hook as shown at 302 in FIG. 8, the microprocessor 62 shown in FIG. 2 receives event ID codes 510 and 511 shown in FIG. 7A in the event queue 101, causing the microprocessor 62 to execute the actions indicated in FIG. 7A under event codes 510 and 511 which essentially represent recognition that the communications appliance 54 has gone off hook. Under these event codes, event code 515 is placed in the event queue 101 to indicate that a local cell event is to occur and to and set the SLIC in use flag 146.

Next, the dialing of DTMF digits in the outgoing call is shown generally at 304 and results in event codes 513 being placed in the event queue 101 causing the microprocessor 62 to effectively gather and store dialed digits in the DTMF buffer 44. The rate of gathering and storing is monitored by the microprocessor 62 as indicated at block 305, until a change in the dialing rate is detected or a timer expires after a final digit has been entered. This results in event code 514 being placed in the event queue 101.

Then, as indicated at block 306 dialing is performed on the wireless network in response to event code 514.

Next, call establishment event codes 515, 524 or 525 are placed in the event queue 101, as required, to set the wireless in use flag 186 active and to reflect the ability of the wireless transceiver port 20, to establish a wireless call as indicated at 308. If a call can be established, then ring back is provided to the communications appliance 54 as indicated at 310, and as provided by event code 523 being stored in the event queue 101.

Next, if applicable, caller identification information may be provided from the wireless network as indicated at 312, in which case event code 522 is placed in the event queue 101 and handled as indicated in FIG. 7A, by the microprocessor 62, wherein the microprocessor gathers and stores CLID information in a SLIC CLID buffer 153 for transmission to the communications appliance 54, where it may be displayed.

During the call, call control events may occur as indicated at 314 and in this regard at least one event code 523 may be placed in the event queue 101 and dealt with by the microprocessor 62 as indicated at 523 in FIG. 7B, to generate tone signals at the communications appliance 54.

In the event that the user of the communications appliance 54 hangs up, a disconnect function 316 occurs whereby event code 512 is placed in the event queue 101 and the response associated with that event code shown in FIG. 7A is executed by the microprocessor 62, whereby the microprocessor 62 transmits "end" key signal to the first wireless interface 64 and resets the SLIC in use and cell in use flags among the flags 142 and any other flags that may have been used in this call scenario, to disconnect the first wireless transceiver 24 as indicated at 318, to terminate the call.

Figure 9:
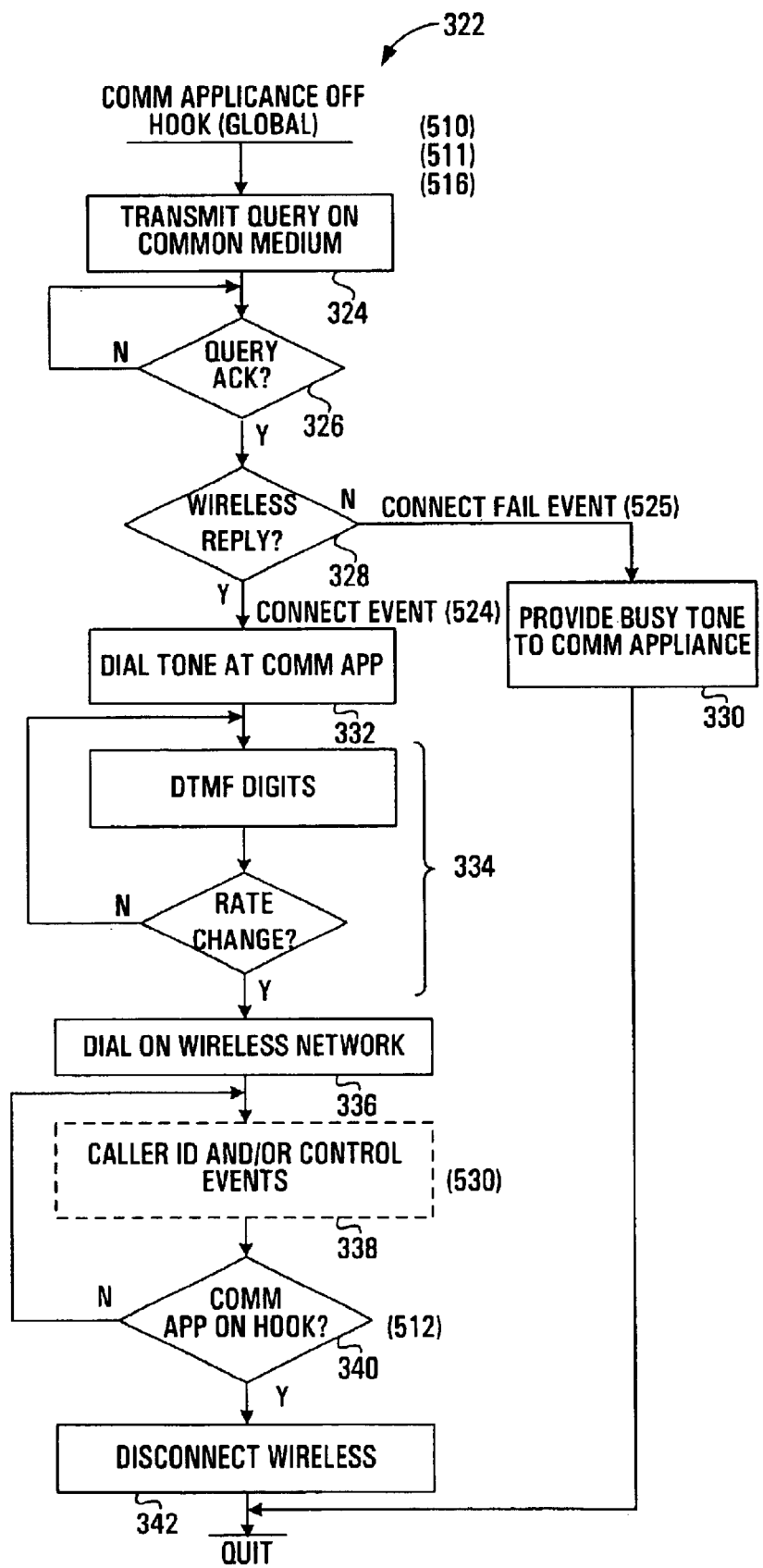
FIG. 9 is a flowchart of actions taken to establish an outgoing call from a communications appliance interface on the first communications unit of the system shown in FIG. 1, to a wireless transceiver port on another communications unit of the system.

Outgoing Call From First Communications Appliance, Using Second Wireless Transceiver Referring to FIG. 9, to make an outgoing call from the communications appliance 54 shown in FIG. 1 to the second wireless transceiver 26, the local configuration is such that at least the global outgoing access flag among the flags 142 is active. When the user takes the communications appliance 54 off hook as shown at 322 in FIG. 9, event ID code 510 is stored in the event queue 101 shown in FIG. 2. In response to the SLIC interrupt event 510, the SLIC off hook event code 511 is stored in the event queue 101 to represent recognition that the communications appliance 54 has gone off hook. This also results in the generation of a global wireless event code 516 being stored in the event queue 101, which causes the microprocessor 62 to transmit a query wireless command (160 in FIG. 6A) on the common medium 67 as indicated at 324, to determine the availability of the second wireless transceiver port 22 on the second communications unit 14. If a query acknowledgement is received as indicated at 326, control of the second wireless interface of the second wireless transceiver port 22 is established to which a reply is obtained as indicated at 328. If a connect fail event command is received from the second wireless interface a connect fail event 525 is stored in the event queue and the microprocessor 62 in the first communications unit 12 provides a busy tone to the communications appliance as indicated at 330. If a connect event command is received from the second wireless interface, a connect event code 524 is stored in the event queue 101 of the first communications unit 12 and the microprocessor 62 sets the pass through flag 150 active and provides dial tone to the communications appliance 54, as indicated at 332. The user may then dial DTMF digits, as indicated generally at 334, which are handled as described above in connection with event codes 513 and 514, wherein the microprocessor 62 gathers and stores dialed digits in the DTMF buffer until the rate of change of digit entry changes, or their expiry occurs indicating the user has stopped dialing. Then as indicated at 336, the digits in the DTMF buffer 144 are communication to and dialed by the second transceiver 26 in response to commands such as send FSK (182 in FIG. 6B).

As indicated at 338, in the event that the second wireless transceiver in the second communications unit 14 receives call control signals, appropriate commands are sent to the first communications unit 12, using channel zero to cause the microprocessor 62 to place a PCM wireless call control event code 530 (with data) into the event queue 101, to which it responds as indicated at 530 in FIG. 7B, to execute a call control function such as providing a disconnect audio signal to the communications appliance interface 36 to discontinue the audio path in response to a user going on hook at the receiving end of the call.

In the event that the user of the communications appliance 54 hangs up, as indicated at 340, a disconnect function occurs whereby event code 512 is placed in the event queue 101 and the response associated with that event code shown in FIG. 7A is executed by the microprocessor 62, whereby the microprocessor 62 transmits an "end" key signal to the second wireless interface and resets the SLIC in use and wireless in use flags 146, 186 in the first communications unit 12 and any other flags that may have been used in this call scenario, to disconnect the second wireless transceiver 26 as indicated at 342, to terminate the call.

Figure 10:
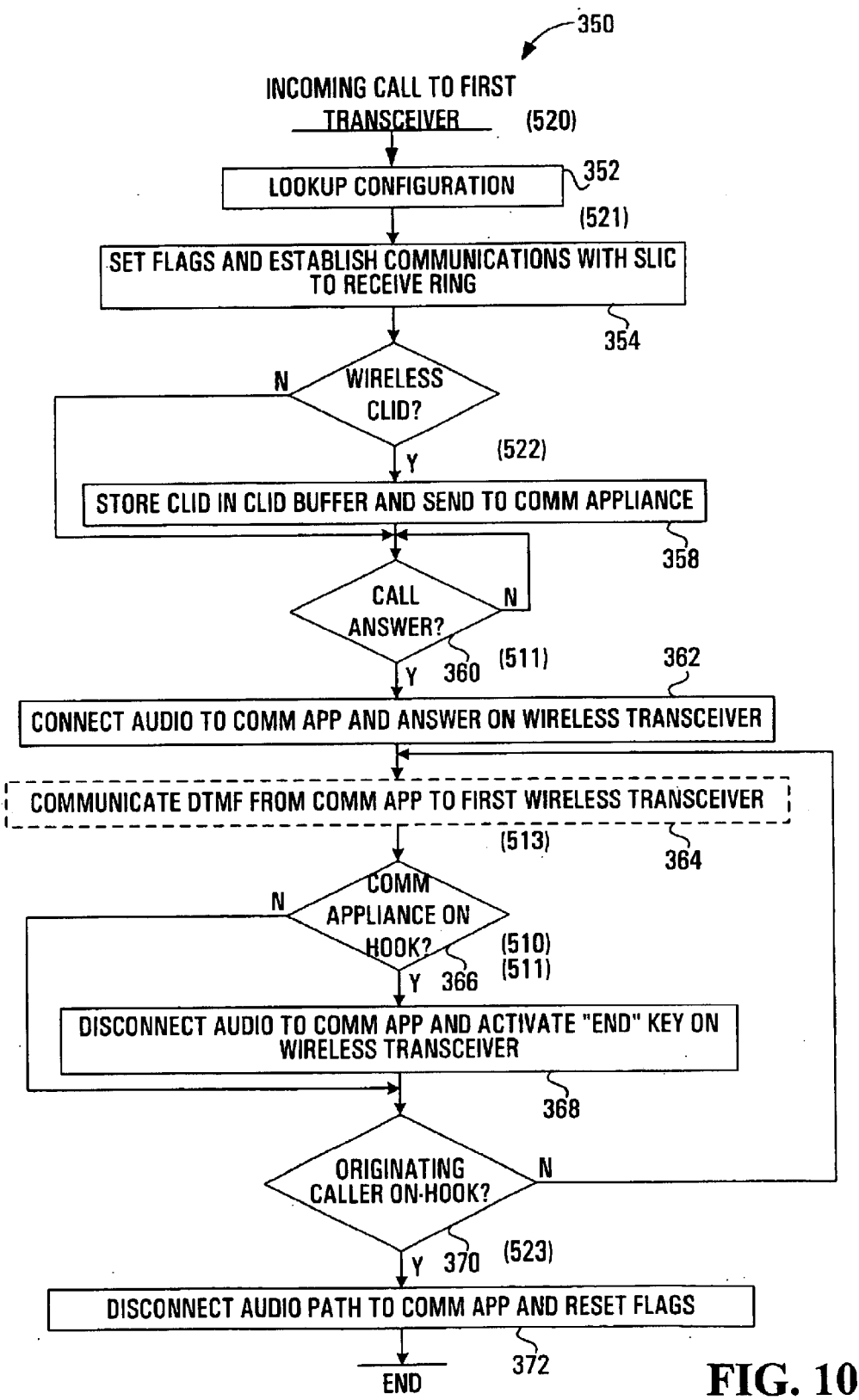
FIG. 10 is a flowchart of actions taken by to receive an incoming call from a wireless transceiver interface on the first communications unit of the system shown in FIG. 1, to a communications appliance interface of the same communications unit.

Establishing a Call From the First Wireless Transceiver to the First Communications Appliance Similarly, local communications may be established between the first wireless transceiver port 20 and the first communications appliance interface 36 to permit the first wireless transceiver 24 to communicate with the communications appliance 54. To do this, the local configuration is programmed such that at least the local incoming access flag is set active. Referring to FIG. 10 as shown at 350, when a call is received at the first transceiver 24 shown in FIG. 1 from a wireless base station, a wireless interrupt event code 520 is produced by the wireless transceiver interface 64 and stored in the event queue 101 shown in FIG. 2. The microprocessor 62 responds as indicated at 352 in FIG. 10, wherein it looks up the current configuration 112 and produces and stores the wireless incoming call event code 521 in the event queue 101. The microprocessor 62 responds to this event code as indicated at 354, by setting the cell in use flag 186 and setting the local SLIC voice routing flag 149 and establishes communications with the SLIC 80, to cause the communications appliance connected thereto to receive ring signals.

As indicated at 356, in the event that wireless calling line identification data is received, wireless CLID data event code 522 is stored in the event queue 101 and dealt with as indicated at 358 in FIG. 10, whereupon the microprocessor stores CLID data in the CLID buffer 180 and provides it to the communications appliance 54. As indicated at 360, when the user answers the call at the communications appliance 54, a SLIC interrupt event code 510 is produced and stored in the event queue 101, resulting in a SLIC off hook event code 511 being stored in the event queue 101 and resulting in "connect audio" signals being provided to the SLIC 80 and answer key signals being provided to the first wireless transceiver interface 64 to cause it to establish communication with the first wireless transceiver 24 to effect an "answer" key press, whereby an audio path is established between the communications appliance and the first wireless transceiver, as indicated at 362.

As indicated at 364, while the audio path is established, if the user of the communications interface 54 dials a digit SLIC DTMF, event code 513 is placed in the event queue 101, causing the microprocessor 62 to store the digit and communicate it to the first wireless transceiver 24 for dispatch just as if it were a keypress on the handset of the first wireless transceiver 24.

As indicated at 366, if the user hangs up at the communications appliance 54, then a SLIC interrupt code 510 is generated, which produces a SLIC on hook event code 511 to which the microprocessor 62 responds as indicated at 368 in FIG. 10, whereupon the audio path is disconnected and "End" key signals are communicated to the first wireless transceiver 24 and SLIC in use and transceiver in use flags 146 and 186 are reset. As indicated at 370, if the originating party should end the call, the wireless transceiver interface 64 causes a wireless call control event code 523 (with data), to be placed in the event queue 101 to which the microprocessor 62 responds as indicated at 372, whereupon the audio path is disconnected and SLIC in use and transceiver in use flags 146 and 186 are reset and the call is ended.

Establishing a Call From the First Wireless Transceiver to the Second Communications Appliance Similarly, a call may be made from the first wireless transceiver 24 to the second communications appliance 42 by first programming the global outgoing access flag 142 active regardless of the states of the remaining access flags.

Figure 11:
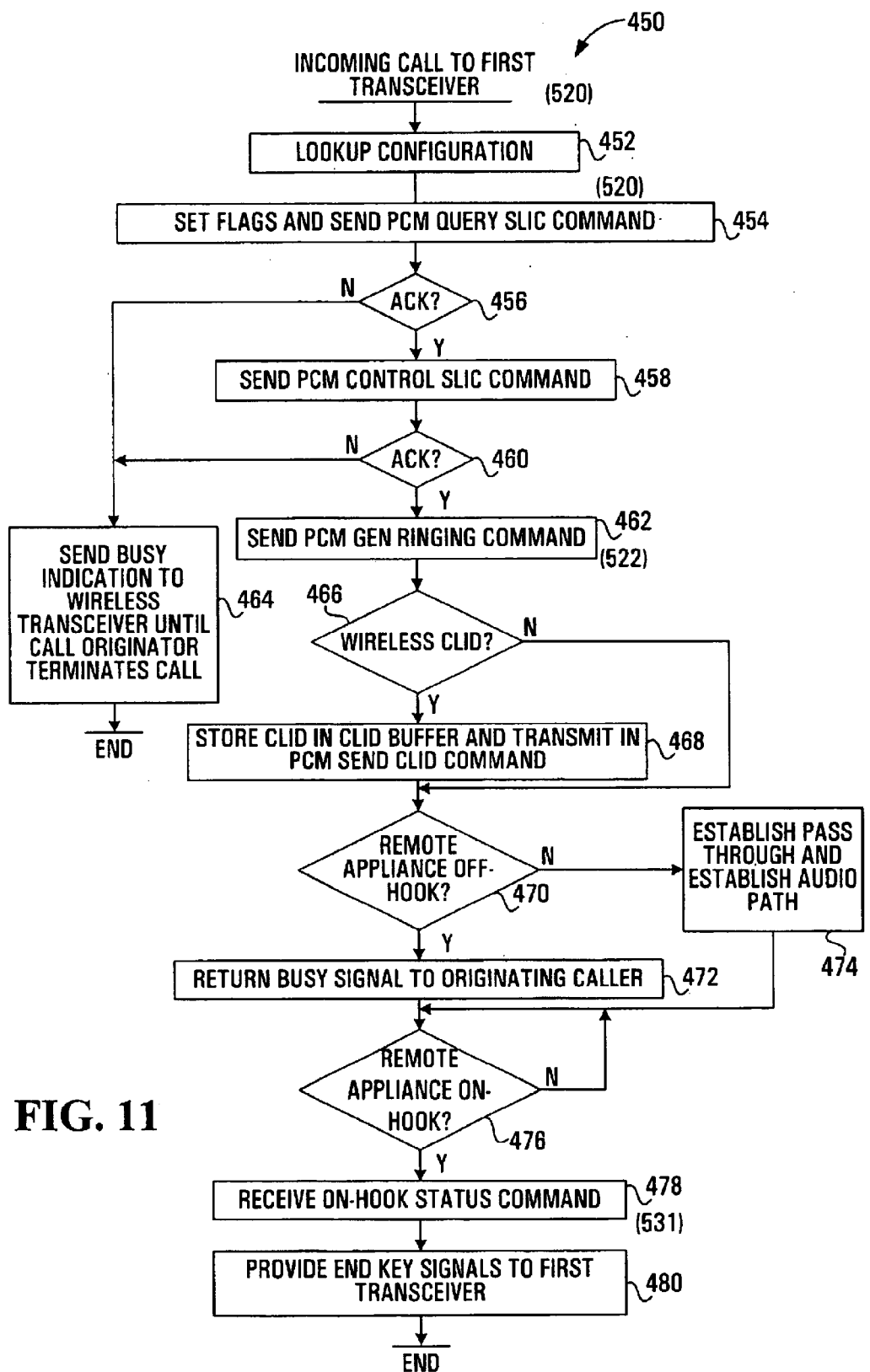
FIG. 11 is a tabular representation of event codes and actions taken by the processor circuit shown in FIG. 2, to receive an incoming call from a wireless transceiver interface on a first communications unit of the system shown in FIG. 1 to a communications appliance interface of another communications unit.

Referring to FIG. 11, events associated with establishing a call from the first wireless transceiver 24 shown in FIG. 1 to the second communications appliance such as extension telephone 42, 44, or 46 connected to the third communications unit 16, for example, are shown generally at 450. This procedure begins with a wireless interrupt event code 520 being stored in the event queue 101 shown in FIG. 2, in response to receipt of a wireless call at the first transceiver 24. The microprocessor 62 responds to the event, as indicated at 452 where it looks up the current configuration 112 and produces and stores a wireless incoming call event code 521 to which the microprocessor 62 responds as indicated at 454, by setting the global SLIC flag 151 and by sending a PCM Query SLIC command (166 in FIG. 6A) on the common medium 67.

As indicated at 456, if an acknowledgement is received a control SLIC command (170 in FIG. 6A) is transmitted on the common medium 67. If an acknowledgement command (168 in FIG. 6A) is received, then a PCM control SLIC command (170 in FIG. 6A) is transmitted as indicated at 458. As indicated at 460, if an acknowledgement command (172 in FIG. 6A) is received, then as indicated at 462, a PCM generate ringing command (174 in FIG. 6A) is transmitted on the common medium 67. If no acknowledgement command (176 in FIG. 6A) is received to either message at steps 454 or 458, then as indicated at 464, a busy indication is provided by the microprocessor 62 to wireless transceiver interface 64 until the call originator terminates the call.

In response to a wireless CLID data event code 522 in the event queue 101, as indicated at 466, the microprocessor 62 stores calling line identification data in a CLID buffer 180 in the RAM 65. It then checks whether the global SLIC flag 151 is set and if so, transmits a PCM send CLID command (182 in FIG. 6B) on the common medium 67 to transmit calling line identification data stored in the CLID buffer 180 to a remote communications interface as indicated at 468.

As indicated at 470, if the second communications appliance 42 is off hook, in other words the second communications appliance interface 38 is in use, a PCM line status SLIC event code 532 is stored in the event queue 101 to which the microprocessor 62 responds, as indicated at 472, effectively returning a busy signal to the originating caller. Otherwise a pass through mode is established and an audio path s established as indicated at 474

As indicated at 476 and 478, if the second communications appliance 42 should go on hook during the call, a SLIC Line—Status Command (157 in FIG. 6C) is transmitted on the common medium 67 to the first communications unit 16. This causes a PCM SLIC call control event code 531 to be stored in the event queue 101. In response, the microprocessor 62 executes the functions indicated at 480 in which the microprocessor 62 causes "End" key signals to be provided to the first wireless transceiver 24 to terminate the wireless call.

While specific embodiments of the invention have been described and illustrated, such embodiments should be considered illustrative of the invention only and not as limiting the invention as construed in accordance with the accompanying claims.

What is claimed is:

1. A communications unit comprising:
   a) a first wireless transceiver port operable to communicate with a first wireless transceiver operable to conduct wireless communications with a wireless base station;
   b) a first expansion interface in communication with said first wireless transceiver port, having a bus interface operable to communicate with expansion interfaces of respective communications unit on respective communication channels associated with respective said communications units, to permit any of said communications units communicate with said wireless base station through the first wireless transceiver;
   c) a processor circuit programmed to effect communications between said first wireless transceiver port and said first expansion interface;
   d) a first communications appliance interface, said processor circuit being operable to effect communications between said first wireless transceiver port, said first expansion interface and said communications appliance interface;
   e) said processor circuit being programmed to receive dialed digits from said communications appliance interface and communicate said dialed digits to said first wireless transceiver port to cause a transceiver in communication with said first wireless transceiver port to dial said dialed digits on a wireless network; and said processor circuit being programmed to communicate said dialed digits to said first wireless transceiver in response to a change in the rate at which dialed digits are received at said communications appliance interface.

2. The communications unit of claim 1 wherein said bus interface is operable to the time multiplex said communications channels.

3. The communications unit of claim 1 wherein said bus interface is operable to frequency multiplex said communications channels.

4. The communications unit of claim 1 wherein said first wireless transceiver port and said first expansion interface are on a common base.

5. The communications unit of claim 1 wherein said first communications appliance interface is operable to selectively communicate with at least one of the first wireless transceiver and said first expansion interface, to permit a communications appliance connected to said first communications appliance interface to communicate with the wireless base station or another communications unit in communication with said first expansion interface.

6. The communications unit of claim 5 wherein said first expansion interface is programmable by commands received from a communications appliance in communication with said first communications appliance interface.

7. The communications unit of claim 5 wherein said first communications appliance interface includes an analog telephone interface.

8. The communications unit of claim 5 wherein said first wireless transceiver port, said first communications appliance interface and said first expansion interface are contained within a common base.

9. The communications unit of claim 5 wherein said first expansion interface and said first communications appliance interface are selectively operable to use said first wireless transceiver port.

10. The communications unit of claim 5 wherein said first expansion interface is operable to support independent communications between another communications unit and the wireless transceiver while supporting independent communications between another communications unit and said first communications appliance interface.

11. The communications unit of claim 5 wherein said first expansion interface is programmable by commands received at said communications appliance interface.

12. The communications unit of claim 1 wherein said first expansion interface is programmable by commands received from at least one of said first wireless transceiver port and one of said communications units.

13. The communications unit of claim 12 wherein said first expansion interface is programmable to cause said first wireless transceiver port to selectively communicate with one of a plurality of communications units operable to communicate with said first expansion interface.

14. The communications unit of claim 1 wherein said bus interface includes a Pulse Code Modulation bus interface.

15. The communications unit of claim 1 wherein said first wireless transceiver port includes a receptacle operable to receive and hold a wireless telephone.

16. The communications unit of claim 1 wherein said first wireless transceiver port is operable to communicate with a data interface on a wireless telephone.

17. The communications unit of claim 1 wherein said processor circuit is programmed to communicate said dialed digits to said first wireless transceiver interface in response to expiry of a timeout period after entry of said dialed digits at said communications appliance.

18. The communications unit of claim 1 wherein said first wireless transceiver port is operable to communicate with a first wireless transceiver operable to conduct wireless communications with a wireless base station of a public network.

19. A system for providing multiple access to a wireless transceiver, the system comprising:
a) a plurality of communications units, at least one of which includes:
i) a first wireless transceiver port operable to communicate with a first wireless transceiver operable to conduct wireless communications with a wireless base station; and
ii) a first expansion interface in communication with said first wireless transceiver port and having a bus interface operable to communicate with expansion interfaces of respective communications units on respective communications channels associated with respective said communications units, to permit any of said communications units to communicate with said wireless base station through the first wireless transceiver;
b) wherein each of said communications units comprises a communications appliance interface operable to communicate with said first wireless transceiver port and wherein at least some of the communications units have respective wireless transceiver ports operable to be accessed by any of said communications appliance interfaces and wherein any of said communications units having a respective wireless transceiver port is operable to receive programming information from other communications units to configure said any of said communications units having a respective wireless transceiver port to selectively make its wireless transceiver port and its communications appliance interface communicate with a wireless transceiver port or a communications appliance interface of at least one other of said plurality of communications units.

20. The system of claim 19 wherein any of said communications appliance interfaces can access any of said wireless transceivers, through respective expansion interfaces on respective communications units on which said any of said communications appliance interfaces are located and respective communications units on which any of said wireless transceivers are located.

21. A method of providing multiple access to a wireless transceiver, comprising:
supporting communications, through a first expansion interface, having a bus interface configured to provide a plurality of communications channels, associated with respective communications units, between a first wireless transceiver port of a first communications unit and at least one of said respective communications units,
receiving dialed digits from a communications appliance interface of said at least one of said respective communications units and communicating said dialed digits to a first wireless transceiver operable to communicate with a wireless base station and in communication with said first wireless transceiver port, to dial said dialed digits on a wireless network wherein communicating said dialed digits to said first wireless transceiver comprises communicating said dialed digits to said first wireless transceiver interface in response to a change in the rate at which dialed digits are received at said communications appliance interface; and
using said first wireless transceiver port to communicate with the first wireless transceiver to permit said at least one of said respective communication units to communicate with said wireless base station through said first wireless transceiver.

22. The method of claim 21 wherein supporting communications comprises conducting communications with at least one of said communications units on time multiplexed channels.

23. The method of claim 21 wherein supporting communications comprises conducting communications with at least one of said communications units on frequency multiplexed channels.

24. The method of claim 21 wherein supporting communications comprises supporting communications between said first wireless transceiver port and said first expansion interface within a common base.

25. The method of claim 21 further comprising selectively conducting communications between a first communications appliance interface and at least one of the first wireless transceiver and said first expansion interface, to permit a communications appliance connected to said communications appliance interface to communicate with the wireless base station or another communications unit in communication with said first expansion interface.

26. The method of claim 25 further comprising conducting communications with a telephone in communication with said first communications appliance interface.

27. The method of claim 25 further comprising selecting which of said first expansion interface and said first communications appliance interface are to use said first wireless transceiver port.

28. The method of claim 25 further comprising simultaneously supporting independent communications between one of said respective communications units and said wireless transceiver while supporting independent communications between another of said respective communications units and said first communications appliance interface.

29. The method of claim 25 further comprising programming said first expansion interface by commands received at said communications appliance interface.

30. The method of claim 25 further comprising programming said first expansion interface port by commands received from a communications appliance in communication with said first communications appliance interface.

31. The method of claim 21 further comprising programming said first expansion interface by commands received from at least one of said first wireless transceiver port and said at least one of said respective communications units.

32. The method of claim 31 further comprising programming said first expansion interface to cause said first wireless transceiver port to selectively communicate with one of said respective communications units.

33. The method of claim 21 wherein supporting communications comprises supporting communications through a Pulse Code Modulation bus interface.

34. The method of claim 21 further comprising receiving and holding a wireless telephone in a receptacle to facilitate connection of said wireless telephone to said wireless transceiver port.

35. The method of claim 21 further comprising causing said first wireless transceiver port to communicate with a data interface on a wireless telephone.

36. The method of claim 21 further comprising communicating said dialed digits to said first wireless transceiver interface in response to expiry of a timeout period after entry of said dialed digits at said communications appliance.

37. A method of providing multiple access to a wireless transceiver, comprising:
supporting communications, through a first expansion interface, having a bus interface configured to provide a plurality of communications channels, associated with respective communications units, between a first wireless transceiver port of a first communications unit and at least one of said respective communications units by supporting communications between a communications appliance interface on any of said communications units and said first wireless transceiver port;
supporting communications between wireless transceiver ports on at least some of said communications units and communications appliance interfaces on at least some of said communications units;
using said first wireless transceiver port to communicate with a first wireless transceiver operable to conduct wireless communications with a wireless base station, to permit any of said communication units to communicate with said wireless base station through said first wireless transceiver; and
programming any of said communications units from other communications units having a respective wireless transceiver port from another of said communications units to configure said any of said communications units having a respective wireless transceiver port to selectively make its wireless transceiver port and its communications appliance interface communicate with a wireless transceiver port or a communications appliance interface of at least one other of said plurality of communications units.

38. The method of claim 37 wherein supporting communications comprises causing respective expansion interfaces on respective communications units to permit any of said communications appliance interfaces to access any of said wireless transceivers.

39. A communications unit comprising:
a) a first wireless transceiver port operable to communicate with a first wireless transceiver operable to conduct wireless communications with a wireless base station; and
b) a first expansion interface in communication with said first wireless transceiver port and having a bus interface operable to communicate with expansion interfaces, the same as said first expansion interface, of respective communications units on respective communications channels associated with respective said communications units, to permit any of said communications units to communicate with said wireless base station through the first wireless transceiver.

* * * * *